United States Patent
Sankar et al.

(10) Patent No.: US 9,398,104 B2
(45) Date of Patent: Jul. 19, 2016

(54) RANKING TEST FRAMEWORK FOR SEARCH RESULTS ON AN ONLINE SOCIAL NETWORK

(71) Applicants: Sriram Sankar, Palo Alto, CA (US); Kihyuk Hong, Palo Alto, CA (US)

(72) Inventors: Sriram Sankar, Palo Alto, CA (US); Kihyuk Hong, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 546 days.

(21) Appl. No.: 13/721,717

(22) Filed: Dec. 20, 2012

(65) Prior Publication Data

US 2014/0181192 A1    Jun. 26, 2014

(51) Int. Cl.
*H04L 29/08* (2006.01)
*G06Q 50/00* (2012.01)
*G06Q 30/02* (2012.01)

(52) U.S. Cl.
CPC ............. *H04L 67/22* (2013.01); *G06Q 30/02* (2013.01); *G06Q 50/01* (2013.01)

(58) Field of Classification Search
CPC ......... H04L 67/22; G06Q 30/02; G05Q 50/01
USPC ........................................................ 709/204
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 * | 8/2010 | Chevalier et al. | 707/723 |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1 | 10/2012 | Myllymaki | |
| 8,306,922 B1 * | 11/2012 | Kunal et al. | 705/319 |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |

(Continued)

OTHER PUBLICATIONS

Wikipedia; *Discounted Cumulative Gain*; http://en.wikipedia.org/wiki/Discounted_cumulative_gain, Oct. 2, 2012.

*Primary Examiner* — Brian J Gillis
*Assistant Examiner* — Steve Lin
(74) *Attorney, Agent, or Firm* — Baker Botts L.L.P.

(57) ABSTRACT

In one embodiment, a method includes accessing a social graph comprising a plurality of nodes and edges, receiving a set of scored results from a user that include results generated by a search algorithm in response to a query from the user and a score for each result, where each result corresponds to a node of the social graph, calculating a gain for each result based on the score of the result, and modifying the search algorithm based on the calculated gain.

18 Claims, 4 Drawing Sheets

(56) References Cited

U.S. PATENT DOCUMENTS

| | | |
|---|---|---|
| 8,572,129 B1 | 10/2013 | Lee |
| 8,595,297 B2 | 11/2013 | Marcucci |
| 8,601,027 B2 | 12/2013 | Behforooz |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,930,340 B1 * | 1/2015 | Sobol et al. ............... 707/706 |
| 8,935,255 B2 | 1/2015 | Sankar |
| 8,935,261 B2 | 1/2015 | Pipegrass |
| 8,935,271 B2 | 1/2015 | Lassen |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0086676 A1 | 7/2002 | Hendrey |
| 2002/0196273 A1 | 12/2002 | Krause |
| 2003/0078914 A1 * | 4/2003 | Witbrock ................ 707/3 |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0136419 A1 | 6/2006 | Brydon |
| 2006/0190436 A1 | 8/2006 | Richardson |
| 2007/0106659 A1 * | 5/2007 | Lu et al. ............... 707/5 |
| 2007/0233672 A1 * | 10/2007 | Sanfacon et al. ............... 707/5 |
| 2007/0277100 A1 | 11/2007 | Sheha |
| 2008/0033926 A1 | 2/2008 | Matthews |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0094200 A1 | 4/2009 | Baeza-Yates |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0265326 A1 | 10/2009 | Lehrman |
| 2009/0276414 A1 * | 11/2009 | Gao et al. ............... 707/5 |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0125562 A1 | 5/2010 | Nair |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0226918 A1 | 8/2013 | Berkhim |
| 2013/0246404 A1 | 9/2013 | Annau |
| 2014/0046934 A1 * | 2/2014 | Zhou et al. ............... 707/723 |
| 2014/0122465 A1 * | 5/2014 | Bilinski et al. ............... 707/723 |
| 2014/0129540 A1 * | 5/2014 | Riley et al. ............... 707/709 |
| 2014/0129552 A1 * | 5/2014 | Sinha et al. ............... 707/724 |
| 2015/0046566 A1 * | 2/2015 | Vaynblat ............... G06Q 50/01 709/217 |

* cited by examiner

RANKING TEST FRAMEWORK FOR SEARCH RESULTS ON AN ONLINE SOCIAL NETWORK

TECHNICAL FIELD

This disclosure generally relates to search engines and online social networks.

BACKGROUND

Search engines have become popular tools to identify and locate specific information on the Internet. A search engine is a computer program that, when queried for information, retrieves either related information or pointers to the location of related information, or both, by evaluating content stored in its search database. A key metric in evaluating the performance of search engines is relevance of the search results. Search engine developers are always striving to deliver search results that are relevant to the search query being processed. Consistent with this goal, there have been attempts to rank search results based on a number of different factors. One of the more popular ways to rank search results involves analyzing the location and frequency of keywords on a webpage. Another frequently used technique is analyzing how webpages link to each other.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

SUMMARY OF PARTICULAR EMBODIMENTS

In particular embodiments, a ranking test framework may be used to evaluate the effectiveness of a particular search algorithm used by a search engine. A user of an online social network may transmit a search query to the search engine. In response to this search query, the search engine may identify resources of the online social network, such as nodes on a social graph or profile pages, that correspond to the query. These identified resources may be used to generate a set of the search results that are provided to the user, such as in a list on a search results webpage that includes links to the identified resources. The user may then review and score each result based on its relevance to the search query. These scores may then be transmitted to the search engine, which may calculate the gain for the search results. The gain is a quality metric that measures the effectiveness of the search algorithm. In this way, the quality of the search results generated by a particular search algorithm may be evaluated. The search algorithm may then be modified based on the calculated gain in order to improve the quality of the results generated by the algorithm, such that subsequent search results in response to the same search query will be more relevant to the query.

DESCRIPTION OF EXAMPLE EMBODIMENTS

Figure 1:
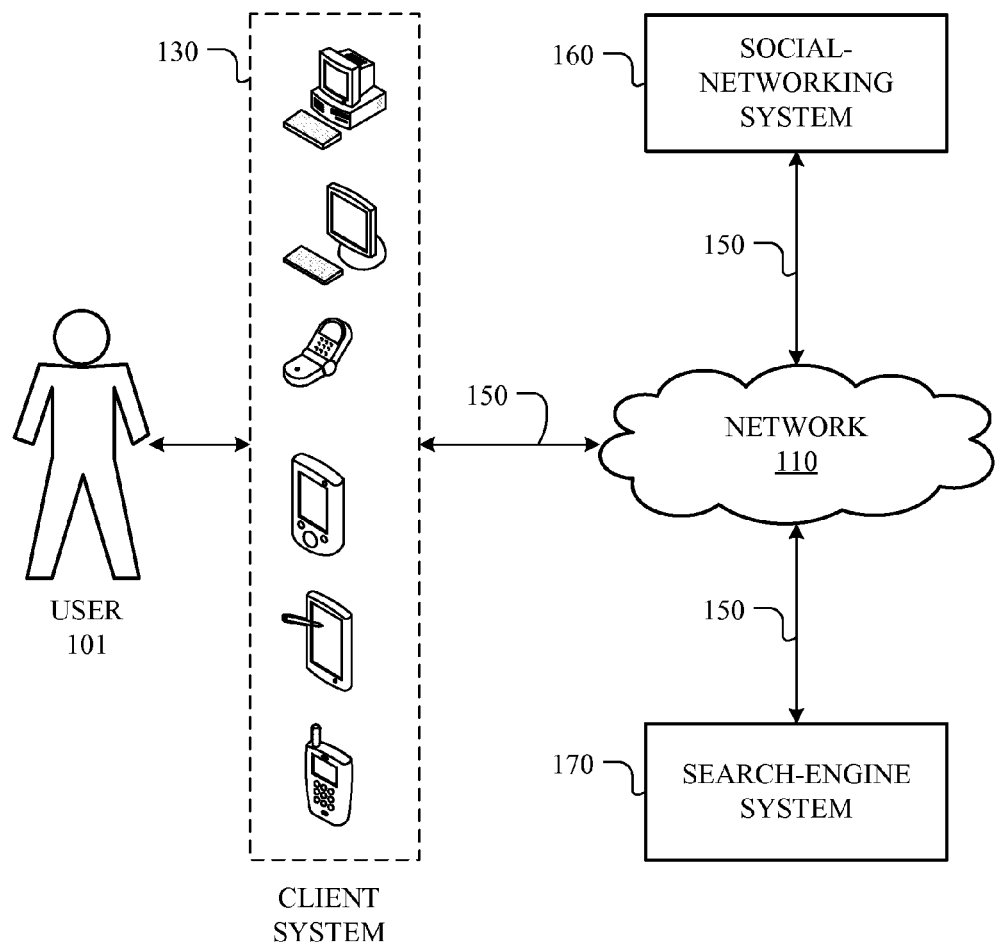
FIG. 1 illustrates an example network environment associated with a social-networking system.

FIG. 1 illustrates an example network environment 100 associated with a social-networking system. Network environment 100 includes a user 101, a client system 130, a social-networking system 160, and a search-engine system 170 connected to each other by a network 110. Although FIG. 1 illustrates a particular arrangement of user 101, client system 130, social-networking system 160, search-engine system 170, and network 110, this disclosure contemplates any suitable arrangement of user 101, client system 130, social-networking system 160, search-engine system 170, and network 110. As an example and not by way of limitation, two or more of client system 130, social-networking system 160, and search-engine system 170 may be connected to each other directly, bypassing network 110. As another example, two or more of client system 130, social-networking system 160, and search-engine system 170 may be physically or logically co-located with each other in whole or in part. Moreover, although FIG. 1 illustrates a particular number of users 101, client systems 130, social-networking systems 160, search-engine systems 170, and networks 110, this disclosure contemplates any suitable number of users 101, client systems 130, social-networking systems 160, search-engine systems 170, and networks 110. As an example and not by way of limitation, network environment 100 may include multiple users 101, client system 130, social-networking systems 160, search-engine systems 170, and networks 110.

In particular embodiments, user 101 may be an individual (human user), an entity (e.g. an enterprise, business, or third-party application), or a group (e.g. of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g. search-engine systems 170), such as, for example, by setting appropriate privacy settings. In particular embodiments, search-engine system 170 may be a network-addressable computing system that can host an online search engine. Search-engine system 170 may generate, store, receive, and send search-related data, such as, for example, search queries, search results, and other suitable search-related data. As an example and not by way of limitation, search-engine system 170 may implement one or more search algorithms to identify network resources in response to search queries received at search-engine system 170, one or more scoring algorithms or ranking algorithms to score and/or rank identified network resources, or one or more summarization algorithms to summarize identified network resources. In particular embodiments, a scoring algorithm implemented by search-engine system 170 may use a machine-learned scoring formula, which the scoring algorithm may obtain automatically from a set of training data constructed from pairs of search queries and selected Uniform Resource Locators (URLs), where appropriate. Search-engine system 170 may be accessed by the other components of network environment 100 either directly or via network 110. In particular embodiments, one or more users 101 may use one or more client systems 130 to access, send data to, and receive data from social-networking system 160 or search-engine system 170. Client system 130 may access social-networking system 160 or search-engine system 170 directly, via network 110, or via a third-party system. As an example and not by way of limitation, client system 130 may access search-engine system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and search-engine system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
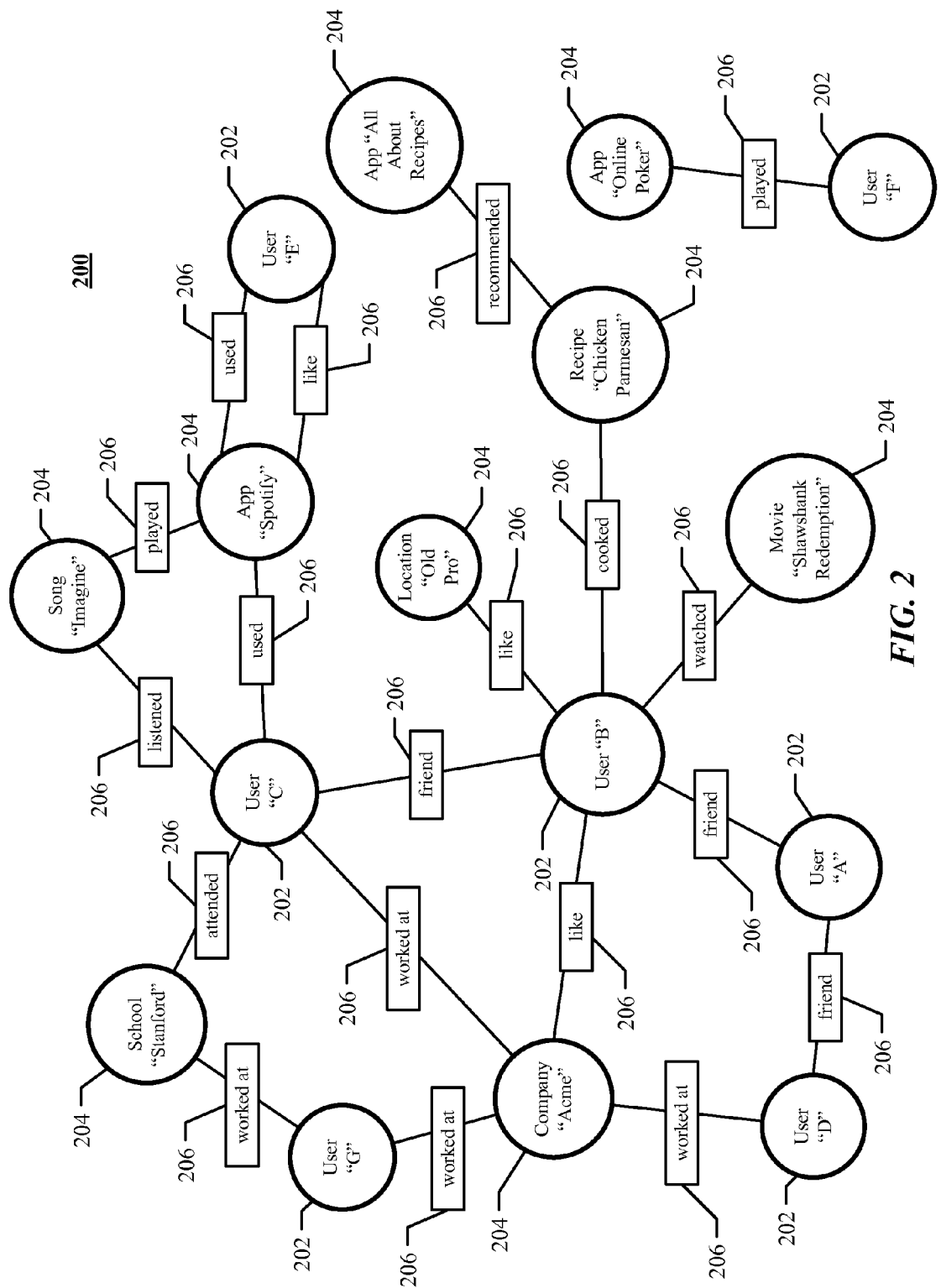
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, a user of a client system 130 may search for information relating to a specific subject matter (e.g., persons, places, content, or resources) by providing a short phrase describing the subject matter, often referred to as a "search query," to a search engine. The search engine may conduct a search based on the query phrase using various search algorithms and generate search results that identify resources (e.g., webpages, content, or other information) that are most likely to be related to the search query. A search algorithm is an algorithm for finding an item with specified properties among a collection of items. To conduct a search, a user may input or transmit a search query to the search engine, which may be hosted by a search-engine system 170. In response, the search engine may identify one or more resources that are likely to be related to the search query, which may collectively be referred to as the "search results" identified for the search query. The search results may be presented to the user, often in the form of a list of links (or other suitable references) on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The user may then be able to click on the URL links to view the specific resources contained in the corresponding webpages as he wishes. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are relatively more relevant to the search query or to the user may be ranked higher than the resources that are relatively less relevant to the search query or the user. In particular embodiments, the search engine may limit its search to resources and content on the online social network. However, in particular embodiments, the search engine may also search for resources on other sources, such as third-party systems, the internet or World Wide Web, or other suitable sources.

In particular embodiments, the search-engine system 170 may use a ranking test framework to evaluate the effectiveness of a particular search algorithm. A user of an online social network may transmit a search query to the search-engine system 170 (which may be a independent of, a sub-system of, or otherwise associated with the social-networking system 160). In response to this search query, the search-engine system 170 may identify resources of the online social network, such as nodes on the social graph or profile pages, that correspond to the query. These identified resources may be used to generate a set of the search results that are provided to the user, such as in a list on a search results webpage that includes links to the identified resources. The user may then review and score each result based on its relevance to the search query. These scores may then be transmitted to the search-engine system 170, which may calculate the gain for the search results, where the gain is a quality metric that measures the effectiveness of the search algorithm. In this way, the quality of the search results generated by a particular search algorithm may be evaluated. The search algorithm may then be modified based on the calculated gain in order to improve the quality of the results generated by the algorithm, such that subsequent search results in response to the same search query will be more relevant to the query. Although this disclosure describes using a particular ranking test framework in a particular manner, this disclosure contemplates using any suitable ranking test framework in any suitable manner.

In particular embodiments, the search-engine system 170 may transmit a query template to a first user (i.e., querying user) of an online social network. The first user may access the query template from any suitable client system 130, either directly, or via the social-networking system 160. The query template may include one or more fields where the first user can input a reference to a particular user node 202, concept node 204, or edge 206 of the social-graph 200, or node-type or edge-type. As an example and not by way of limitation, the search-engine system 170 may provide a query template to the first user that reads as follows: "Show me friends of [user] who like [concept]," where [user] and [concept] are fields where the may input references (e.g., a name or other identifier) of a particular user node 202 and concept node 204, respectively. In this case, for example, the first user may input the text "User C" and "Acme", respectively, to generate the query "Show me friends of User C who like Acme." Once the first user has finished inputting into the fields of the query template, the user may then send the completed query from his client system 130 to the search-engine system 170. Although this disclosure describes generating particular queries in a particular manner, this disclosure contemplates generating any suitable queries in any suitable manner. As an example and not by way of limitation, the first user may simply generate a query by entering a text string into an input field on a search engine webpage.

In particular embodiments, the search-engine system 170 may receive a query from the first user. The query may contain references to particular social-graph elements, such as user nodes 202, concept nodes 204, edges 206, node- or edge types, or any combination thereof. The reference may be a name or other identifier of the social-graph element. As an example and not by way of limitation, referencing FIG. 2, the search-engine system 170 may receive a query from the first user of "Show me friends of User C who like Acme." In this query, the references to "User C" and "Acme" may refer to particular nodes on the social graph 200, while the references to "friends of" and "like" may refer to particular edges on the social graph 200. In particular, the query from the first user may be a structured query, such as, for example, the structured queries described in U.S. patent application Ser. No. 13/556,060, which is incorporated by reference herein. Although this disclosure describes receiving particular queries in a particular manner, this disclosure contemplates receiving any suitable queries in any suitable manner.

In particular embodiments, the search-engine system 170 may access a social graph 200, as described previously. The social graph 200 may include a user node 202 corresponding with the first user (i.e., the querying user). The social graph 200 may also include one or more user nodes 202 or concept nodes 204 that each corresponds to a concept or another user of the online social network. As described previously, a node may be connected to another node by one or more edges 206. Although this disclosure describes accessing a particular social graph in a particular manner, this disclosure contemplates accessing any suitable social graph in any suitable manner.

In particular embodiments, the search-engine system 170 may identify one or more nodes in the social graph 200 that correspond to the query received from the first user. The search-engine system 170 may conduct a search based on the query, or one or more query phrases (e.g., one or more n-grams from the query), using an particular search algorithm (or a particular combination of search algorithms) and generate search results that identify resources (e.g., social-graph elements, profile pages) that are most likely to be related to the search query. In response to the search query, the search-engine system 170 may identify one or more nodes (or profile pages corresponding to these nodes) that are likely to be related to the search query, which may collectively be referred to as the "search results" identified for the search query. In particular embodiments, the search-engine system 170 may identify nodes in the social graph 200 that are connected to one or more of the nodes (or node-types) referenced in the received search query by one or more of the edges (or edge-types) referenced in the query. As an example and not by way of limitation, referencing FIG. 2, if the search-engine system 170 receives the search query "Show me friends of User C who like Acme," the search-engine system 170 may parse the query into the n-grams "friends of," "User C," "like," and "Acme," which may then be used to identify relevant social-graph elements. Using these n-grams, search-engine system 170 may then identify the nodes corresponding to "User C" and "Acme," as illustrated in FIG. 2. It may also identify one or more of the "friend" or "like" edges 206 connecting to these nodes, as further illustrated in FIG. 2. The search-engine system 170 may then identify nodes in the social graph 200 that are connected to the identified nodes by the identified edges. For example, the search-engine system 170 may identify the user-node 202 for "User B," since that node is both connected by a "friend" edge 206 to the user node 202 for "User C" and by a "like" edge 206 to the concept node 204 for "Acme." Although this disclosure describes identifying particular resources in response to a query in a particular manner, this disclosure contemplates identifying any suitable resources in response to a query in any suitable manner.

In particular embodiments, the search-engine system 170 may generate one or more search results (or simply "results") corresponding to the identified nodes. The search results may be presented to the user in the form of a list of references on a search-results webpage, each reference being associated with an identified node (or a profile page corresponding to that node). As an example and not by way of limitation, the reference in the search results may include an identifier of the node and a Uniform Resource Locator (URL) that specifies where the corresponding profile page is located and the mechanism for retrieving it. The results (e.g., the identified nodes or their corresponding profile pages) may be ranked according to their relative degrees of relevance to the search query, as determined by the particular search algorithm used to generate the search results. The most relevant result may be ranked highest, with the remaining results having lower ranks commensurate with their relevance, such that the least relevant result is ranked lowest. Thus, each result has a rank with respect to the other results in the set of search results. As an example and not by way of limitation, in response to a first query, $q_1$, a first search algorithm may generate a set of N ranked search results, $(r_1, r_2, \ldots, r_N)$, where $r_1$ is the highest ranked result, with subsequent results being lower ranked and $r_N$ being the lowest ranked result. Although this disclosure describes generating particular search results in a particular manner, this disclosure contemplates generating any suitable search results in any suitable manner.

In particular embodiments, the search-engine system 170 may receive a set of scored results from the first user (i.e., querying user). The scored results will include a score corresponding to each search result generated by a particular search algorithm, where the score indicates a graded relevance of the result. The set of scored results may also include the search results. The scores may be generated by the first user. As an example and not by way of limitation, each result may be scored using a scale of 0-to-3, where a score of 0 corresponds to a result that is not relevant to the query from the first user, with increasing scores correspond to results that are increasingly relevant to the query, such that a score of 3 corresponds to a result that is completely relevant to the query. After receiving a set of search results generated in response to a search query, the first user may review each result and assign a score of 0-to-3 to the result. The score for each result may then be recorded and transmitted to the search-engine system 170 as a set of scored results corresponding to the set of search results provided in response to the search query. In this way, the quality of the search results generated by a particular search algorithm may be evaluated. In particular embodiments, the set of scored results may comprise a set of tuples. As an example and not by way of limitation, each scored result in the set of scores results may be a tuple of the form of: (u,q,r,s), where u is an identifier corresponding to the querying user (such as, for example, an identifier corresponding to the user node 202 of the first user), q is the query received from the user, r is one of the results generated by a particular search algorithm (such as, for example an identifier corresponding to a concept node 204 or user node 202 of another user), and s is the score corresponding to the result (such as, for example, a score on a 0-to-3 scale, as described previously). Thus, a set of tuples, S, representing the scored search results for results 1 to N may be in the form of: $S_{1 \to N} = \{(u_1,q_1,r_1,s_1), (u_1,q_1,r_2,s_2), \ldots, (u_1,q_1,r_N, s_N)\}$. Although this disclosure describes receiving particular scored results in a particular manner, this disclosure contemplates receiving any suitable scored results in any suitable manner.

In particular embodiments, the search-engine system 170 may calculate a gain for each result in the first set of scored results based on the score corresponding to the result. The gain is a quality metric that measures the effectiveness of a search algorithm. In particular embodiments, calculating the gain for each result may also be based on the rank of the result. By using a graded relevance scale of search results based on their position in the results list (i.e., rank), the effectiveness of a search algorithm may be more accurately measured. This assumes that the search algorithm is more effective when it places more relevant documents higher in the search results lists (i.e., ranks those results higher). In particular embodiments, the search-engine system 170 may calculate the discounted cumulative gain (DCG) for a result, where the DCG measures the gain of a result based on its position in the list of search results (i.e., the rank of the result). The gain is accumulated from the top of the result list to the bottom, with the gain of each result discounted for lower ranking results. DCG may be calculated using a variety of formulas. One example formula for calculating the DCG of a result having rank p is:

$$DCG_p = s_1 + \sum_{i=2}^{p} \frac{s_i}{\log_2(i)},$$

where $s_1$ is the score corresponding to the result $r_1$. Other suitable formulas for calculating DCG may also be used. As an example and not by way of limitation, the first user may provide the following scored search results: $S_{1 \to 6} = \{(r_1,3),(r_2, 2),(r_3,3),(r_4,0),(r_5,1),(r_6,2)\}$, where the results are ranked in order from highest to lowest. The DCG for results 1 to 6 would be 3, 5, 6.89, 6.89, 7.32, and 8.09, respectively. In particular embodiments, the search-engine system 170 may calculate the normalized DCG (nDCG) for a result. The nDCG allows for a comparison of the performance of the search algorithm between different queries and between different querying users. The nDCG may be calculated by first sorting the results by their relevance (i.e., by their score), which should produce the maximum possible DCG for the result having rank p and is called the ideal DCG (IDCG) for the result. The nDCG is then calculated as:

$$nDCG_p = \frac{DCG_p}{IDCG_p}.$$

As an example and not by way of limitation, continuing with the previous example, the idealized ordering of the scores would be 3, 3, 2, 2, 1, 0. Thus, IDCG for results 1 to 6 would be 3, 6, 7.26, 8.26, 8.69, and 8.69, respectively. Similarly, the normalized DCG for results 1 to 6 would be 1, 0.83, 0.95, 0.83, 0.84, and 0.93, respectively. Although this disclosure describes calculating a particular gain in a particular manner, this disclosure contemplates any suitable gain in any suitable manner.

In particular embodiments, the search-engine system 170 may modify the search algorithm used to generate a set of search results based on the calculated gain for each result in the set of search results. The search-engine system 170 may determine modifications for the search algorithm, for example, by using machine learning feature weights. Modifying the search algorithm may be done in a variety of ways. As an example and not by way of limitation, the search-engine system 170 may identify one or more possible modifications for the current search algorithm. A search algorithm using one or more of these modifications may then be used to generate a new set of search results. The search-engine system 170 may then determine a new normalized DCG for the new set of search results. In this case, nDCG may be used as a guideline to the quality of the new algorithm and the evaluation may be done offline without additional input from querying users. If the new nDCG is higher than the nDCG for the current search algorithm, then the modifications used to generate the new set of search results may be incorporated into the current search algorithm to generate a new search algorithm. In particular embodiments, the scored search results and the calculated gains from multiple user and multiple queries may be considered when modifying the search algorithm to improve the quality of its generated results. Although this disclosure describes modifying particular search algorithms in a particular manner, this disclosure contemplates modifying any suitable search algorithms in any suitable manner.

Figure 3:
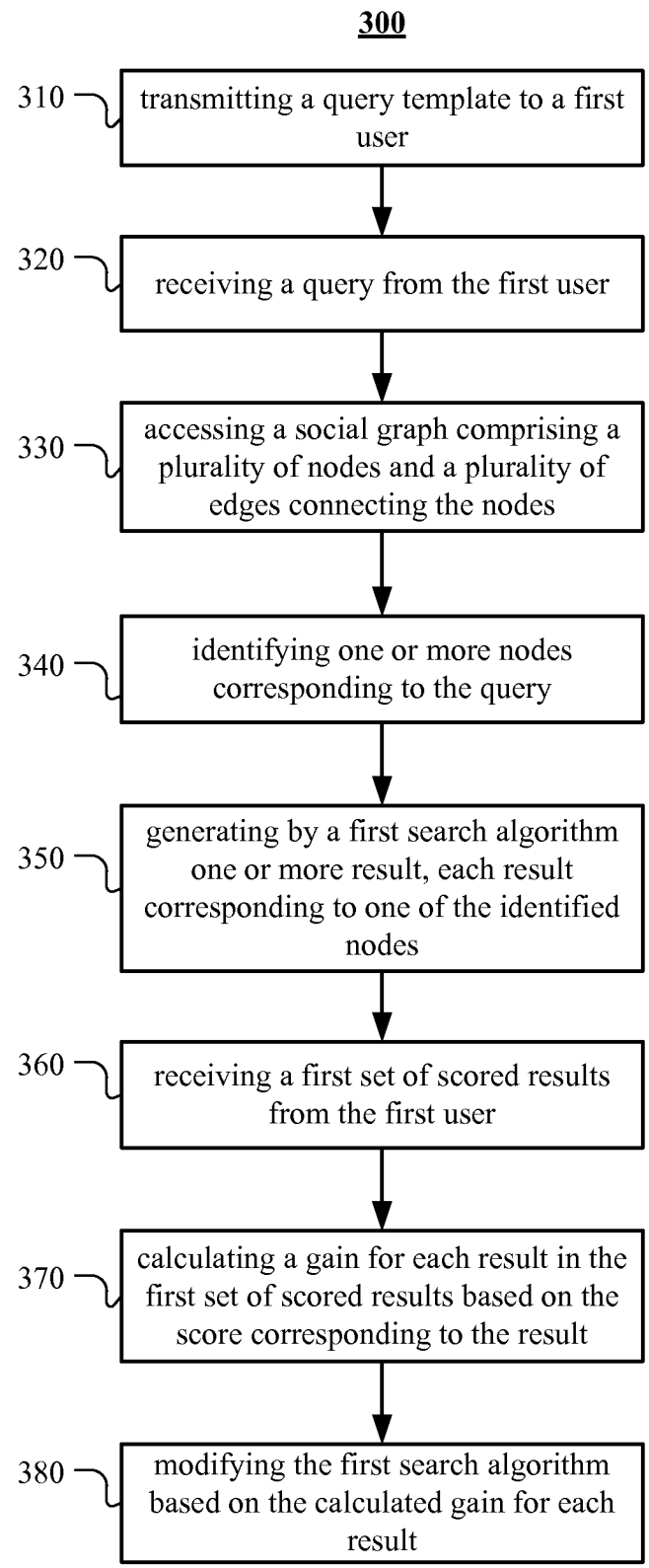
FIG. 3 illustrates an example method for implementing a ranking test framework for search results.

FIG. 3 illustrates an example method 300 for implementing a ranking test framework for search results. The method may begin at step 310, where the search-engine system 170 may transmit a query template to a first user of an online social network. At step 320, the search-engine system 170 may receive a query from the first user. At step 330, the search-engine system 170 may access a social graph 200 comprising a plurality of nodes (user nodes 202, concept nodes 204, or any combination thereof) and a plurality of edges connecting the nodes. At step 340, the search-engine system 170 may identify one or more nodes corresponding to the query. At step 350, the search-engine system 170 may generate by a first search algorithm one or more results. Each result in this set of search results may correspond to one of the identified nodes from step 340. At step 360, the search-engine system 170 may receive a first set of scored results from the first user. The scored results may identify the results generated by the first search algorithm from step 350, and a score corresponding to each result. The results may be generated by the first user. At step 370, the search-engine system 170 may calculate a gain for each result in the first set of scored results based on the score corresponding to the result. The gain may be calculated, for example, using a discounted cumulative gain algorithm. At step 380, the search-engine system 170 may modify the first search algorithm based on the calculated gain for each result from step 370. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
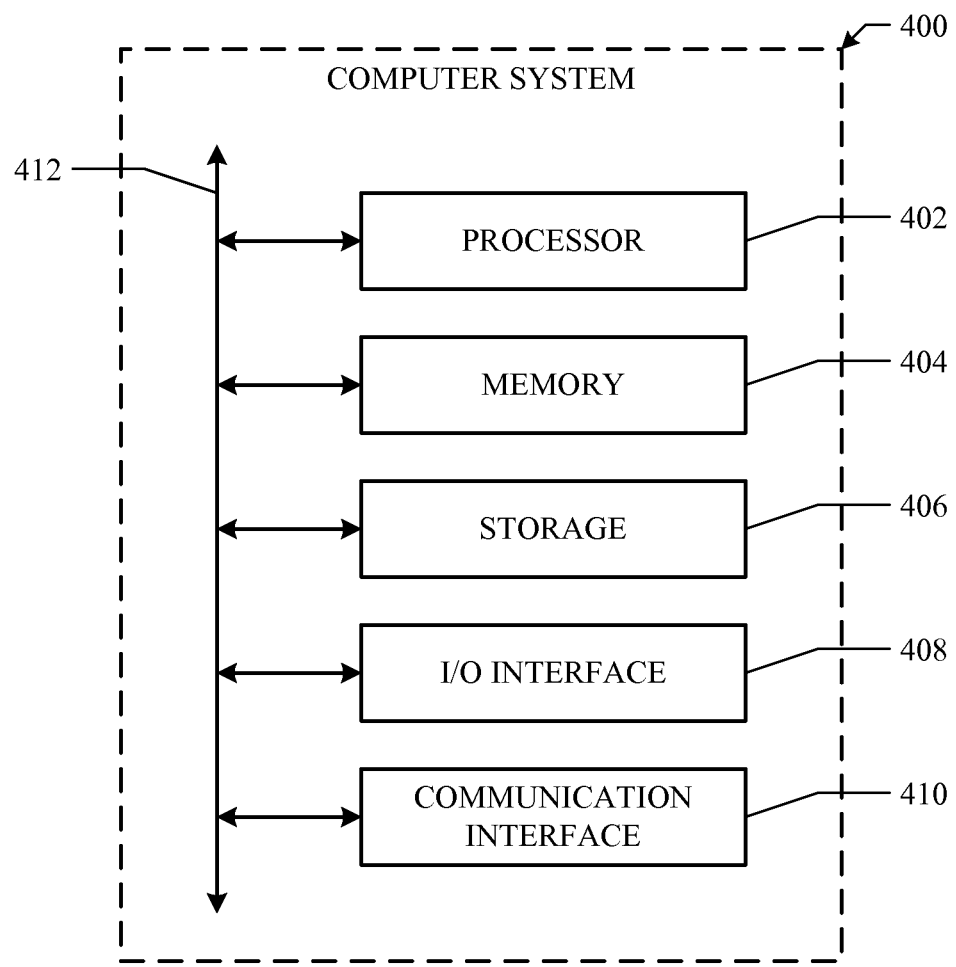
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a computing device:
   accessing a social graph comprising a plurality of nodes and a plurality of edges connecting the nodes, each of the edges between two of the nodes representing a single degree of separation between them, the nodes comprising:
      a first-user node corresponding to a first user associated with an online social network; and
      a plurality of second nodes that each correspond to a concept or a second user associated with the online social network;
   receiving a first set of scored results from the first user comprising:
      one or more results generated by a first search algorithm in response to a query from the first user, wherein the one or more results correspond to one or more second nodes, respectively, the one or more results being personalized for the first user based on social-graph information associated with the first user; and
      one or more scores inputted by the first user corresponding to the one or more results, respectively;
   calculating a discounted cumulative gain for each result in the first set of scored results based on the score inputted by the first user corresponding to the result; and
   modifying the first search algorithm based on the calculated gain for each result, wherein the first search algorithm is modified to improve the ranking of search results personalized for the first user.

2. The method of claim 1, wherein the first set of scored results comprises one or more tuples, each tuple comprising:
   an identifier corresponding to the first-user node;
   the query from the first user;
   a result corresponding to one of the second nodes, wherein the result is generated by the first search algorithm in response to the query; and
   a score corresponding to the result.

3. The method of claim 1, wherein each result in the first set of scored results has a rank with respect to the other results in the first set of scored results.

4. The method of claim 3, wherein calculating the gain for each result in the first set of scored results is further based on the rank of the result.

5. The method of claim 1, further comprising:
   transmitting a query template to the first user, wherein the query template comprises one or more fields where the first user can input a reference to a second node or an edge; and
   receiving the query from the first user, wherein the query comprises references to one or more second nodes and one or more edges inputted by the first user.

6. The method of claim 1, further comprising:
   receiving the query from the first user; and identifying one or more second nodes corresponding to the query; and generating by the first search algorithm the one or more result, each result corresponding to one of the identified second nodes.

7. The method of claim 1, wherein each query comprises references to one or more second nodes and one or more edges.

8. The method of claim 7, wherein, for each result in the first set of scored results, the second node corresponding to the result is connected to at least one of the second nodes referenced in the query by at least one of the edges referenced in the query.

9. A system comprising: one or more processors; and a memory coupled to the processors comprising instructions executable by the processors, the processors operable when executing the instructions to:

accesses a social graph comprising a plurality of nodes and a plurality of edges connecting the nodes, each of the edges between two of the nodes representing a single degree of separation between them, the nodes comprising:

a first-user node corresponding to a first user associated with an online social network; and a plurality of second nodes that each correspond to a concept or a second user associated with the online social network;

receive a first set of scored results from the first user comprising:

one or more results generated by a first search algorithm in response to a query from the first user, wherein the one or more results correspond to one or more second nodes, respectively, the one or more results being personalized for the first user based on social-graph information associated with the first user; and one or more scores inputted by the first user corresponding to the one or more results, respectively;

calculate a discounted cumulative gain for each result in the first set of scored results based on the score inputted by the first user corresponding to the result; and modify the first search algorithm based on the calculated gain for each result, wherein the first search algorithm is modified to improve the ranking of search results personalized for the first user.

10. The system of claim 9, wherein the first set of scores results comprises one or more tuples, each tuple comprising:

an identifier corresponding to the first-user node;

the query from the first user;

a result corresponding to one of the second nodes, wherein the result is generated by the first search algorithm in response to the query; and a score corresponding to the result.

11. The system of claim 9, wherein each result in the first set of scored results has a rank with respect to the other results in the first set of scored results.

12. The system of claim 11, wherein calculating the gain for each result in the first set of scored results is further based on the rank of the result.

13. The system of claim 9, wherein the processors are further operable when executing the instructions to:

transmit a query template to the first user, wherein the query template comprises one or more fields where the first user can input a reference to a second node or an edge; and receive the query from the first user, wherein the query comprises references to one or more second nodes and one or more edges inputted by the first user.

14. The system of claim 9, wherein the processors are further operable when executing the instructions to:

receive the query from the first user; and identify one or more second nodes corresponding to the query; and generate by the first search algorithm the one or more result, each result corresponding to one of the identified second nodes.

15. The system of claim 9, wherein each query comprises references to one or more second nodes and one or more edges.

16. The system of claim 15, wherein, for each result in the first set of scored results, the second node corresponding to the result is connected to at least one of the second nodes referenced in the query by at least one of the edges referenced in the query.

17. One or more computer-readable non-transitory storage media embodying software that is operable when executed to:

access a social graph comprising a plurality of nodes and a plurality of edges connecting the nodes, each of the edges between two of the nodes representing a single degree of separation between them, the nodes comprising:

a first-user node corresponding to a first user associated with an online social network; and a plurality of second nodes that each correspond to a concept or a second user associated with the online social network;

receive a first set of scored results from the first user comprising:

one or more results generated by a first search algorithm in response to a query from the first user, wherein the one or more results correspond to one or more second nodes, respectively, the one or more results being personalized for the first user based on social-graph information associated with the first user; and one or more scores inputted by the first user corresponding to the one or more results, respectively;

calculate a discounted cumulative gain for each result in the first set of scored results based on the score inputted by the first user corresponding to the result; and modify the first search algorithm based on the calculated gain for each result, wherein the first search algorithm is modified to improve the ranking of search results personalized for the first user.

18. The method of claim 1, wherein calculating the discounted cumulative gain (DCG) for each result in the first set of scored results, wherein:

$$DCG_p = s_1 + \sum_{i=2}^{p} \frac{s_i}{\log_2(i)},$$

and wherein $DCG_p$=the discounted cumulative gain of a result having rank p, and $s_i$ is the score corresponding to the result $r_i$.

* * * * *